(12) United States Patent
Linhart

(10) Patent No.: US 6,392,150 B2
(45) Date of Patent: May 21, 2002

(54) CONNECTION SLEEVE FOR A SUCTION TUBE FURNISHED WITH A WIRE PROTECTING SHEATHING FOR STRAIN RELIEVED ELECTRICAL CONDUCTORS

(75) Inventor: Georg Linhart, Wöllstadt (DE)

(73) Assignee: Truplast Kunststofftechnik GmbH, Langgöns (DE)

( * ) Notice: Subject to any disclaimer, the term of this patent is extended or adjusted under 35 U.S.C. 154(b) by 0 days.

(21) Appl. No.: 09/771,337

(22) Filed: Jan. 26, 2001

(30) Foreign Application Priority Data

Jan. 26, 2000 (DE) ..................... 200 01 357 U

(51) Int. Cl.[7] ............................................. H02G 15/02
(52) U.S. Cl. .......................................................... 174/82
(58) Field of Search ............................... 174/82, 138 F, 174/84 R, 84 S, 93

(56) References Cited

U.S. PATENT DOCUMENTS

| | | | | |
|---|---|---|---|---|
| 1,585,688 A | * | 5/1926 | Perry | 174/82 |
| 2,470,886 A | * | 5/1949 | Buzzell | 174/82 |
| 2,509,768 A | * | 5/1950 | Hill | 174/82 X |

* cited by examiner

*Primary Examiner*—Chau N. Nguyen
(74) *Attorney, Agent, or Firm*—Horst M. Kasper

(57) ABSTRACT

A connection sleeve for a suction tube furnished with a wire protecting sheathing for strain relieve electrical conductors is disclosed. The wire protective sheathing is attached at the inner jacket face of the suction tube, wherein a sleeve body is partially plugged into the suction tube. An axial slot begins at the plug in end of the sleeve body, wherein the flanks of the axial slot transition into a pipe like shape formed for the receiving of the coordinated end of the wire protecting sheathing. The electrical conductors are led out of the sleeve body in the region of a section of the axial slot not covered by the suction tube, while an end of the strain relieve element protruding together with the electrical conductors out of the wire protecting sheathing is pull safe united with the sleeve body. The strain relieve element grips through a cross wall aligned perpendicular to the axis of the sleeve body and furnished in the pipe like body and the strain relieve element is secured against pulling back with a thickening on the side of the cross wall directed toward the front end of the sleeve body.

8 Claims, 1 Drawing Sheet

CONNECTION SLEEVE FOR A SUCTION TUBE FURNISHED WITH A WIRE PROTECTING SHEATHING FOR STRAIN RELIEVED ELECTRICAL CONDUCTORS

BACKGROUND OF THE INVENTION

1. Field of the Invention

The invention relates to a connection sleeve for a suction tube furnished with a wire protecting sheathing for strain relieved electrical conductors.

2. Brief Description of the Background of the Invention Including Prior Art

A female disconnect for suction tube furnished with a protective covering for strain relieved electrical conductors is already known. A ring groove is furnished in the jacket of a coupling sleeve body partially inserted into the tube, wherein two strings of a strain relieved element led out of the protective covering are joined at a common location. The threads grip around the floor of the ring groove in opposite direction and are tied together with a knot at the position where they meet again and are thereby in a position jointly receive and accept the operating pull forces acting on them.

In addition an outer sleeve is furnished in connection with the known female disconnect, wherein the outer sleeve covers the ring groove and exhibits at its internal jacket face at least one raised and projected thread turn, wherein the thread turn engages into a wave valley of the suction tube exhibiting on the outside screw like shaped running wave mountains and wave valleys. The conventional construction has already proven itself, however the conventional construction causes a relatively large outer diameter of the sleeve body based on the ring groove because of the presence of the ring groove (German petit patent DE-Gbm 29,7 08,274.4).

Furthermore already a female disconnect has been proposed, wherein also a protective covering for electrical conductors and a strain relief element is furnished at the inner wall of a suction tube. One end of the strain relieved element is led out of the protective covering into a groove like recess of the first sleeve part and is fixed here in position by injection molded material. Furthermore a second sleeve part is furnished wherein the second sleeve part is connected to the first part by way of material injected into the groove like recess. The injection molding of the material fixing the end of the strain relieved element and connecting the two sleeve parts together is an expensive and equipment requiring production process.

There is also known a vacuum cleaner tube with electrical conductors exhibiting on the outside helically running wave valleys and wave mountains from German petit patent DE-Gbm 29,912,640.4, wherein the electrical conductors are disposed in a protective sheathing attached to the inner wall of the tube. An end bush is plugged into the end of the tube, wherein the end bush exhibits an axial slot open at its rear end, wherein the flanks of the axial slot transition into a projecting form for receiving the wire protecting sleeve. The ends of the electrical conductors are in each case led through the axial slot and are thereafter connected with a slip ring of a slip ring carrier, wherein the slip ring carrier surrounds the tube and the end bush. The carrier of the slip ring or collector ring grips into a wave valley of the tube with a projecting winding thread formed at the inner surface of the slip ring carrier and the slip ring carrier is connected shape matching to the end bush.

SUMMARY OF THE INVENTION

1. Purposes of the Invention

It is an object of the present invention to provide a strain relieved element at a connection sleeve for an electrical conductor suction such that a ring groove can be dispensed with and thereby an enlargement of the outer diameter of the sleeve is avoided.

These and other objects and advantages of the present invention will become evident from the description which follows.

2. Brief Description of the Invention

The present invention provides a connection sleeve for a suction tube furnished with a wire protecting sheathing for strain relieved electrical conductors. A suction tube shows an inner jacket face. A wire protecting sheathing is attached at the inner jacket face of the suction tube. A sleeve shaped sleeve body includes a plug in end and a front end, wherein an axial slot having flanks begins at the plug in end of the sleeve body, and wherein the sleeve body is partially inserted and plugged into the suction tube. A pipe like body is attached to the sleeve body and has a front end, wherein the flanks of the axial slot transition into the pipe like body, and wherein the pipe like body is formed for receiving of a coordinated end of a wire protecting sheathing. The pipe like body is open at the plug in end side of the sleeve body and the pipe like body is closed at the front end of the sleeve body. The pipe like body is formed for receiving of a coordinated end of a wire protecting sheathing.

An electrical conductor is led out of the sleeve body in the region of a section of the axial slot not covered by the suction tube. A strain relieve element is disposed in the pipe like body. An end of the strain relieve element protrudes together with the electrical conductor out of the wire protective sheathing and is united pull safe with the sleeve body. A strain relieve element is disposed in the wire protecting sheathing. A cross wall is disposed at the front end of the pipe like body. The strain relieve element grips through the cross wall disposed in the pipe like body and is aligned perpendicular to the axis of the sleeve body. The strain relieve element is secured in its position against pulling out with a thickening disposed on the side of the cross wall directed toward the front end of the sleeve body.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
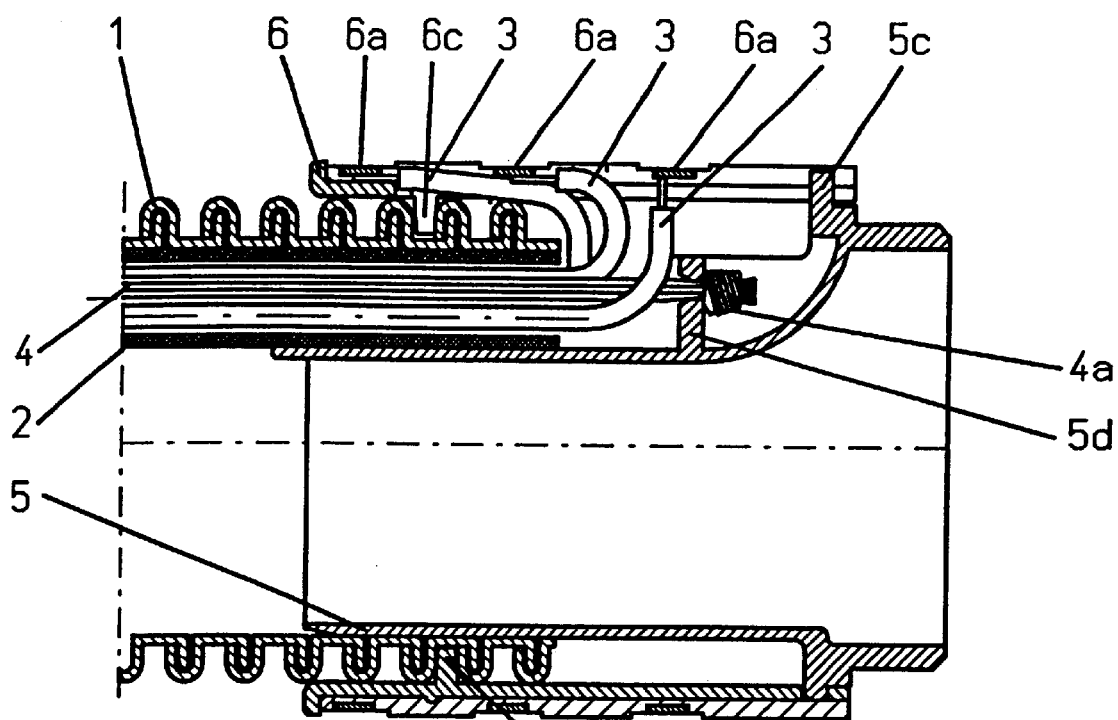
FIG. 1 is a longitudinal sectional view through a connection sleeve.

A tube exhibiting wave mountains and wave valleys running smoothly on the inside and helical shaped on the outside is designated with the reference numeral 1 in FIG. 1. The reference numeral 2 designates a wire protecting sheathing for electrical conductors 3 and for a strain relieve element 4 for the electrical conductors 3, wherein the wire protecting sheathing is attached at the inner wall of the tube 1.

A bush shaped sleeve body 5 is partially inserted and plugged into the tube 1. The tube 1 is formed like helical bellows on its outside for allowing to be engaged and fixed in relative position by a projecting winding thread 6c. The inside surface of the tube 1 is substantially cylindrical and constructed to fit over the outer surface of the sleeve body 5. The suction tube 1 is positioned to cover a length of from about 0.5 to 0.9 times the length of a plug in end of the sleeve body 5.

Figure 2:
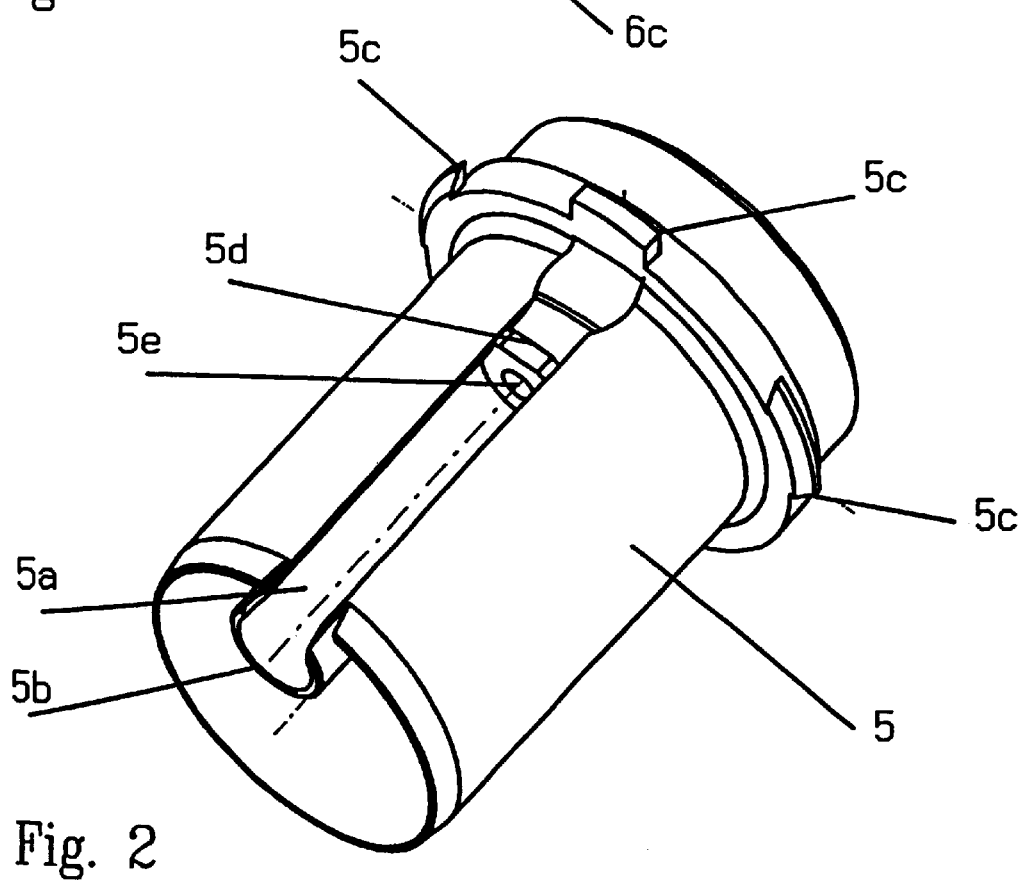
FIG. 2 is a perspective view of the body of the sleeve.

An axial slot 5a (FIG. 2) begins at the plug in end of the sleeve body 5, wherein the flanks of the axial slot 5a transition into a pipe like shape 5b (FIG. 2) formed for the receiving of the coordinated end of the wire protecting sheathing 2. The wire protecting sheathing 2 can be formed as a tube as shown in FIG. 1 or altentatively as a tube having a slot disposed in parallel to the axis of the wire protecting sheathing 2. The sleeve body 5 is furnishes with a plug in end where the electrical wire comes out of the sleeve body 5 and with a front end. The pipe like shape or body 5b is open at the plug in end of the sleeve body 5 and is closed at the opposite end of the sleeve body 5 designated as front end.

The pipe like shape or body 5b is further open in an area where the pipe like shape 5b overlaps with the sleeve body 5 by forming the axially directed slot 5a. The slot 5a can have a width of from about 0.5 to 1.5 times the inner diameter of the pipe like shape 5b. The slot 5a can extend from the plug in end fo the sleeve body 5 to the position of a cross wall 5d in a direction parallel to the axis of the sleeve body 5.

The sleeve body 5 preferably has a front end with an outer diameter about 1.1 to 1.2 times the outer diameter of the plug in end section of the sleeve body 5.

The sleeve body 5 preferably has a front end with an inner diameter about 1.05 to 1.2 times the inner diameter of the plug in end section of the sleeve body 5.

The length of the plug in end section of the sleeve body 5 can be from about 3 to 10 times the length of the front end of the sleeve body 5 and is preferably from about 4 to 7 times the length of the front end of the sleeve body 5.

The thickness of the plug in end section of the sleeve body 5 can be from about 0.3 to 1.0 times the thickness of the front end of the sleeve body 5 and is preferably from about 0.4 to 0.7 times the thickness of the front end of the sleeve body 5.

The distance of the pipe like shape or body 5b from an axis of the sleeve body can be from about 0.3 to 0.7 times the inner radius of the sleeve body 5 at the plug in section and is preferably from about 0.4 to 0.6 times the inner radius of the sleeve body 5 at the plug in section.

The electrical conductors 3 are led out of the sleeve body 5 in the region of a section of the slot 5a not covered by the tube 1 and the electrical conductors 3 are connected there in each case to a slip ring 6a of a slip ring carrier 6. The slip ring carrier 6 in part rests on the outer jacket face of the tube 1 and engages with a projecting winding thread 6c disposed on the inside of the slip ring carrier 6 into a wave valley of the tube 1. Recesses of the slip ring carrier 6 disposed at the front end of the slip ring carrier 6 are in each case penetrated and gripped through by a cam 5c of the sleeve body 5 at the front end of the slip ring carrier 6. The slip ring carrier 6 is thereby fixed radially and axially.

The slip ring carrier 6 is preferably made of an inner tube body having the recesses engaging the sleeve body 5 and having the cam 6c and an outer tube body supporting the slip rings 6a. The outer tube body can have stepped recesses for the slip rings 6a, wherein a first step corresponds to an outer surface of the slip ring and wherein the second step corresponds to a seat for the slip ring 6a and located within the first step. The length of the slip ring carrier 6 can be from about 0.8 to 1.5 times the length of the plug in section of other sleeve body and is preferably from about 1.0 to 1.2 times the length of the plug in section of other sleeve body.

A cross wall 5d is formed in the tubular like shape 5b, wherein the cross wall 5d a recess 5e (FIG. 2) serving for the gripping through of the strain relieve element 4. The size of the crosswall 5d corresponds generally to the inner cross-section of the pipe like shape 5b. Preferably, the cross wall 5d is furnished with a hole opening disposed about a middle of the cross wall 5d.

As can be recognized from FIG. 1, the strain relieve element 4 is secured in its position with a thickening 4a on the side of the cross wall 5d directed toward the front end of the sleeve body 5 against pulling out of its position.

Advantageously the thickening 4a can be formed by a knot made out of the strain relieve element 4 as illustrated in FIG. 1. In order to increase and strengthen the resistance against pulling out of the cross wall 5d, the knot can be soaked with self-hardening material, for example a second adhesive, crazy glue, or another suitable adhesive.

The thickening 4a however can also be formed by a cramp attached at the strain relieve element 4.

It will be understood that each of the elements described above, or two or more together, may also find a useful application in other types of cable system configurations and strain relief procedures differing from the types described above.

While the invention has been illustrated and described as embodied in the context of a connection sleeve for a suction tube furnished with a wire protecting sheathing for strain relieved electrical conductors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connection sleeve for a suction tube furnished with a wire protecting sheathing for strain relieved electrical conductors comprising:

a suction tube having an inner jacket face;

a wire protecting sheathing attached at the inner jacket face of the suction tube;

a sleeve shaped sleeve body having a plug in end and having a front end, wherein an axial slot having flanks begins at the plug in end of the sleeve body, wherein the sleeve body is partially inserted and plugged into the suction tube;

a pipe like body attached to the sleeve body and having a front end, wherein the flanks of the axial slot transition into the pipe like body, wherein the pipe like body is formed for receiving of a coordinated end of the wire protecting sheathing, wherein the pipe like body is open at the plug in end of the sleeve body and wherein the pipe like body is closed at the front end of the sleeve body, and an electrical conductor led out of the sleeve body in the region of a section of the axial slot not covered by the suction tube;

the strain relieve element disposed in the pipe like body, wherein an end of the strain relieve element, protruding together with the electrical conductor out of the wire protective sheathing, is united pull safe with the sleeve body;

the strain relieve element disposed in the wire protecting sheathing;

a cross wall disposed at the front end of the pipe like body, wherein the strain relieve element grips through the cross wall disposed in the pipe like body and is aligned perpendicular to the axis of the sleeve body, and wherein the strain relieve element is secured in its position against pulling out with a thickening disposed on the side of the cross wall directed toward the front end of the sleeve body.

2. The connection sleeve according to claim 1, wherein the thickening comprises a knot formed out of the strain relieve element.

3. The connection sleeve according to claim 2, wherein the knot is soaked with a self hardening material.

4. The connection sleeve according to claim 1, wherein the thickening comprises a cramp attached at the strain relieve element.

5. A connection sleeve for a suction tube furnished with a wire protecting sheathing for strain relieved electrical conductors wherein:

a) a wire protecting sheathing (2) is attached at an inner jacket face of a suction tube (1), wherein a sleeve shaped sleeve body (5) is partially inserted and plugged into the suction tube (1);

b) an axial slot (5a) begins at a plug in end of the sleeve body (5), wherein the flanks of the axial slot (5a) transition into a pipe like shape (5b) formed for receiving of a coordinated end of the wire protecting sheathing (2), wherein the pipe like shape (5b) is open at the plug in end of the sleeve body (5) and is closed at the opposite end;

c) the electrical conductors (3) are led out of the sleeve body (5) in the region of a section of the axial slot (5a) not covered by the suction tube (1), while an end of a strain relieve element (4), protruding together with electrical conductors (3) out of the wire protective sheathing (2), is united pull safe with the sleeve body (5);

d) the strain relieve element (4) grips through a cross wall (5d) disposed in the pipe like shape (5b) and aligned perpendicular to the axis of the sleeve body (5) and wherein the strain relieve element (4) is secured in its position against pulling out with a thickening (4a) disposed on the side of the cross wall (5d) directed toward the front end of the sleeve body (5).

6. The connection sleeve according to claim 5, wherein the thickening (4a) comprises a knot formed out of the strain relieve element (4).

7. The connection sleeve according to claim 6, wherein the knot is soaked with a self hardening material.

8. The connection sleeve according to claim 5, wherein the thickening (4a) comprises a cramp attached at the strain relieve element (4).

* * * * *